(12) United States Patent
Yamashita et al.

(10) Patent No.: US 8,665,302 B2
(45) Date of Patent: Mar. 4, 2014

(54) OPTICAL DEVICE, CONTROL METHOD OF OPTICAL DEVICE, AND IMAGE FORMING APPARATUS

(75) Inventors: Hidetoshi Yamashita, Kanagawa (JP); Naoto Watanabe, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 84 days.

(21) Appl. No.: 13/230,072

(22) Filed: Sep. 12, 2011

(65) Prior Publication Data

US 2012/0069128 A1   Mar. 22, 2012

(30) Foreign Application Priority Data

Sep. 16, 2010   (JP) ................................ 2010-208627

(51) Int. Cl.
 *B41J 2/435*   (2006.01)
(52) U.S. Cl.
 USPC ......................................... 347/236; 347/246
(58) Field of Classification Search
 USPC .................................. 347/236, 237, 246, 247
 See application file for complete search history.

(56) References Cited

U.S. PATENT DOCUMENTS

| | | | | |
|---|---|---|---|---|
| 6,266,077 | B1* | 7/2001 | Kamimura | 347/236 |
| 6,388,694 | B1* | 5/2002 | Fujita | 347/236 |
| 8,164,611 | B2* | 4/2012 | Yamashita | 347/236 |
| 2011/0032323 | A1 | 2/2011 | Yamashita et al. | |

FOREIGN PATENT DOCUMENTS

| | | |
|---|---|---|
| JP | 2008-59689 | 3/2008 |
| JP | 2008-218720 | 9/2008 |
| JP | 2009-65064 | 3/2009 |

OTHER PUBLICATIONS

U.S. Appl. No. 13/163,973, filed Jun. 20, 2011, Yamashita, et al.

* cited by examiner

*Primary Examiner* — Hai C Pham
(74) *Attorney, Agent, or Firm* — Oblon, Spivak, McClelland, Maier & Neustadt, L.L.P.

(57) ABSTRACT

An optical device includes: an irradiation unit that irradiates a part of laser beams output from a light source as a scan beam onto an irradiation target and outputs the remaining part of the laser beams as a monitor beam used to monitor a light amount of the laser beams; a measurement unit that measures a light amount of the monitor beam; a storage unit that stores a plurality of measurement results obtained by the measurement unit when the laser beams are output in a plurality of different light amounts, and the plurality of the different light amounts associated with each other; and a prediction unit that predicts the light amount of the monitor beam relative to a reference light amount of the laser beam using a plurality of the light amounts stored in the storage unit and the measurement results corresponding to the plurality of the light amounts.

9 Claims, 9 Drawing Sheets

FIG.5

| CHAN-NEL NO. | LOW EMISSION POWER $P_1$ | MONITOR VOLTAGE $Vpd_1$ (LOW EMISSION POWER) | HIGH EMISSION POWER $P_2$ | MONITOR VOLTAGE $Vpd_2$ (HIGH EMISSION POWER) |
|---|---|---|---|---|
| ch1 | $P_{1-1}$ | $Vpd_{1-1}$ | $P_{2-1}$ | $Vpd_{2-1}$ |
| ch2 | $P_{1-2}$ | $Vpd_{1-2}$ | $P_{2-2}$ | $Vpd_{2-2}$ |
| ch3 | $P_{1-3}$ | $Vpd_{1-3}$ | $P_{2-3}$ | $Vpd_{2-3}$ |
| ch4 | $P_{1-4}$ | $Vpd_{1-4}$ | $P_{2-4}$ | $Vpd_{2-4}$ |
| ch5 | $P_{1-5}$ | $Vpd_{1-5}$ | $P_{2-5}$ | $Vpd_{2-5}$ |
| ⋮ | ⋮ | ⋮ | ⋮ | ⋮ |
| ch39 | $P_{1-39}$ | $Vpd_{1-39}$ | $P_{2-39}$ | $Vpd_{2-39}$ |
| ch40 | $P_{1-40}$ | $Vpd_{1-40}$ | $P_{2-40}$ | $Vpd_{2-40}$ |

BACKGROUND ART

SOLID LINE: EXPRESSION OBTAINED FROM ORIGIN AND SINGLE MEASUREMENT POINT
DOTTED LINE: PRACTICAL RELATION

OPTICAL DEVICE, CONTROL METHOD OF OPTICAL DEVICE, AND IMAGE FORMING APPARATUS

CROSS-REFERENCE TO RELATED APPLICATIONS

The present application claims priority to and incorporates by reference the entire contents of Japanese Patent Application No. 2010-208627 filed in Japan on Sep. 16, 2010.

BACKGROUND OF THE INVENTION

1. Field of the Invention

The present invention relates to an optical device, a control method of the optical device, and an image forming apparatus.

2. Description of the Related Art

In recent years, a surface-emitting laser called a vertical cavity surface emitting laser (VCSEL) capable of emitting several tens of (for example, about 40) laser beams from a single element is commercially available. Further, an image forming apparatus employing the VCSEL as a laser for exposing a photoreceptor to form images more accurately and rapidly has been proposed.

Meanwhile, in order to mount the VCSEL on the image forming apparatus, it is necessary to prepare a mechanism for adjusting emission beams of the VCSEL to emit a desired light amount. Back beams are not emitted from the VCSEL. For this reason, there is already known a technique for extracting a part of the emission beams (front beams) in a direction different from the emission direction of the emission beams using optical splitting unit for splitting the light beams into two directions and using them as front monitor beams.

As an example of the optical splitting unit, a half mirror or an aperture mirror is used. The half mirror reflects a part of the incident light beams and transmits the remaining light beams. The aperture mirror has an opening for transmitting light beams, for example, in the center of the mirror for totally reflecting the incident light beams.

The light amount of the front monitor beams split by the optical splitting unit (hereinafter, referred to as a front monitor light amount) is measured using an optical receiver such as a photodiode, and is fed back to the light amount control unit of the VCSEL to control the light amount of the emission beams of the VCSEL.

However, in the technique of controlling the light amount using the front monitor beams in the related art, it is difficult to accurately adjust the entire area of the light amount range for controlling the light amount to a desired light amount.

This problem will be described in more detail with reference to FIG. 12. In the related art, the light amount control was performed such that a front monitor light amount for the emission beams generated when the light-emitting element emits a predetermined light amount was measured, and the front monitor light amount for a desired emission beam light amount is calculated based on a primary equation using the origin and a single point obtained by the predetermined light amount and the front monitor light amount. In the example of FIG. 12, the light amount of the laser beam source is controlled based on prediction along a straight line 600 of the primary equation obtained from the origin (0, 0) and the measurement point $(P_1, Vpd_1)$, where $Vpd_1$ denotes the output (front monitor light amount) of the photodiode when light beams are output from a laser beam source at an emission light amount $P_1$. For example, in order to obtain the emission light amount $P_2$, the laser beam source is controlled such that the photodiode has an output value $Vpd_2$.

Here, in the VCSEL, the light beams are emitted from each light-emitting source with an extent (divergence angle) extending in horizontal and vertical directions. As the (horizontal and vertical) divergence angles increase, the light beams are emitted with a larger extent. The divergence angle is changed depending on the change of ambient temperature of the VCSEL or a magnitude of the light amount of the emitted light beams.

In a case where the aperture mirror is used optical splitting unit, a ratio between the amount of light passing through the opening of the aperture mirror and the amount of the reflected light is changed depending on change of the divergence angle so as to change a ratio between the amount of emitted light beams and the amount of the reflected front monitor light. That is, as the divergence angle increases, a proportion of the amount of reflected light increases, and thus the light amount of the front monitor light increases comparative to the light amount of the emission beam light. Therefore, an actual relation between the actual amount of the emitted light beams and the amount of the front monitor light is highly likely to have a function that is not expressed as a primary equation.

For example, assuming that the divergence angle increases as the emission light amount increases, the proportion of the amount of light reflected by the aperture mirror also increases as the emission light amount increases. For this reason, as illustrated in a curve 601 of FIG. 12, in the area where the light amount is larger than that of the measurement point $(P_1, Vpd_1)$, the front monitor light amount becomes larger than that predicted from the primary equation. In the area where the light amount is smaller than that of the measurement point $(P_1, Vpd_1)$, the amount of the front monitor light becomes smaller than the light amount predicted in the primary equation.

Therefore, in a case where the light amount is controlled by feeding back the front monitor light amount, if the light amount at a certain light amount range is controlled based on a relational expression including the primary equation obtained from the amount of light beams of the VCSEL at a single point and the amount of the front monitor light, light amount control accuracy is degraded as much as a deviation amount from an actual curved relation. That is, in prediction using the primary equation, the emission light amount $P_2$ is obtained by controlling the front monitor light amount along the straight line 600 such that the photodiode PD has an output value $Vpd_2$. However, in practice, if the front monitor light amount is controlled such that the photodiode PD has the output value $Vpd_2$, only the emission light amount $P_3$ smaller than the emission light amount $P_2$ is obtained along the curve 601.

Such a problem may occur even when the light amount is controlled by feeding back the back beam light amount.

In order to address such a problem, Japanese Patent Application Laid-Open No. 2009-65064 discloses a technique in which an aperture is also provided between the optical splitting unit and the photodiode in an optical system of the front monitor beam, and the front monitor beam also passes through the opening of the aperture as in the front mirror beam to increase light amount control accuracy. According to Japanese Patent Application Laid-Open No. 2009-65064, even when the (horizontal and vertical) divergence angles are isotropically changed, the light amount ratio between the emitted light beam and the front monitor beam is maintained constant so that the light amount control accuracy improves.

However, in Japanese Patent Application Laid-Open No. 2009-65064 described above, there is a problem in that, in a case where horizontal and vertical components of the divergence angle are changed with a different ratio, as illustrated in FIG. 13, an actual relation between the emission light amount and the front monitor light amount is deviated to the upper or lower direction, relative to the relational expression (straight line 600) based on the primary equation obtained from a single measurement point and the origin as illustrated as curves 602A and 602B due to a change method thereof.

In addition, which one of the upper or lower direction an actual relation between the emission light amount and the front monitor light amount is deflected to, relative to the relation determined by the primary equation, is different depending on the characteristic of an individual light source. For this reason, there is also a problem in that degradation of the light amount control accuracy accompanied by change of the divergence angle is not addressed as described above.

SUMMARY OF THE INVENTION

It is an object of the present invention to at least partially solve the problems in the conventional technology.

According to an aspect of this disclosure, there is provided an optical device including: an irradiation unit that irradiates a part of laser beams output from a light source as a scan beam onto an irradiation target and outputs the remaining part of the laser beams as a monitor beam used to monitor a light amount of the laser beams; a measurement unit that measures a light amount of the monitor beam; a storage unit that stores a plurality of measurement results obtained by the measurement unit when the laser beams are output in a plurality of different light amounts, by associating the plurality of the measurement results with the plurality of the different light amounts, respectively; a prediction unit that predicts the light amount of the monitor beam relative to a reference light amount of the laser beam using a plurality of the light amounts stored in the storage unit and the measurement results corresponding to the plurality of the light amounts; and a control unit that controls the irradiation unit such that the light amount of the monitor beam relative to the reference light amount of the laser beam is equal to the light amount of the monitor beam predicted by the prediction unit.

According to another aspect of this disclosure, there is provided a control method of an optical device, the method including: extracting, by an irradiation unit, a scan beam and a monitor beam used to monitor a light amount of the scan beam from laser beams output from a light source; irradiating, by the irradiation unit, the scan beam onto an irradiation target; measuring, by a measurement unit, a light amount of the monitor beam; predicting, by a prediction unit, the light amount of the monitor beam relative to a reference light amount of the laser beam based on two or more light amounts stored in a storage unit that stores a plurality of measurement results obtained from a plurality of measurement units when the laser beams are output in a plurality of different light amounts, in association with and the plurality of light amounts, each measurement result being associated with each of the two or more light amounts; and controlling, by a control unit, the irradiating of the scan beam such that the light amount of the monitor beam relative to the reference light amount of the laser beams is equal to a light amount of the predicted monitor beam.

According to still another aspect of this disclosure, there is provided an image forming apparatus including: an optical device; and an image forming unit that forms an image using a scan beam output from the optical device, the optical device includes: an irradiation unit that outputs a part of laser beams output from a light source as the scan beam to the image forming unit and outputs the remaining part of the laser beams as a monitor beam used to monitor a light amount of the laser beams; a measurement unit that measures a light amount of the monitor beam; a storage unit that stores a plurality of measurement results obtained by the measurement unit when the laser beams are output in a plurality of different light amounts, by associating the plurality of the measurement results with the plurality of the different light amounts, respectively; a prediction unit that predicts the light amount of the monitor beam relative to a reference light amount of the laser beam using a plurality of the light amounts stored in the storage unit and the measurement results corresponding to the plurality of the light amounts; and a control unit that controls the irradiation unit such that the light amount of the monitor beam relative to the reference light amount of the laser beam is equal to the light amount of the monitor beam predicted by the prediction unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram illustrating an exemplary configuration of a table stored in random access memory (ROM);

DETAILED DESCRIPTION OF THE PREFERRED EMBODIMENTS

Figure 1:
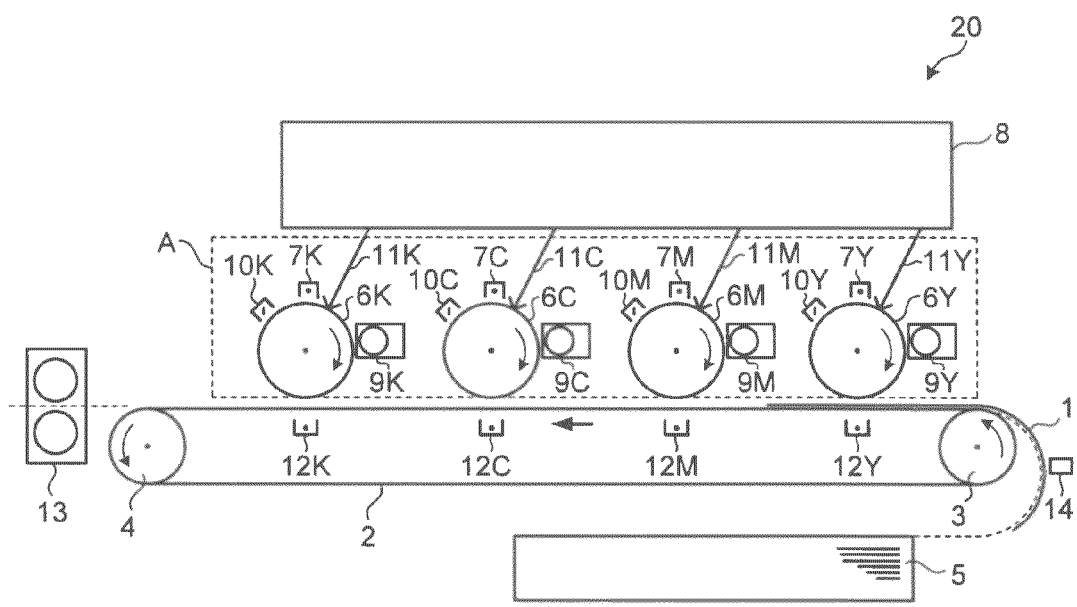
FIG. 1 is a schematic diagram illustrating an exemplary configuration of an image forming apparatus that may be applicable to an optical device according to an embodiment.

Hereinafter, embodiments of the optical device according to the present invention will be described in detail with reference to the accompanying drawings. FIG. 1 schematically illustrates an exemplary configuration of an image forming apparatus 20 applicable to an optical device 100 according to an embodiment. The image forming apparatus 20 is a tandem type color image forming apparatus capable of forming color images using yellow (Y), magenta (M), cyan (C), and black (K) colors.

In the image forming apparatus 20, the image forming units A for forming images of each color YMCK are arranged in a single line along a carriage belt 2 that carries a paper sheet 1. The image forming units A include a first image forming unit, a second image forming unit, a third image forming unit, and forth image forming unit. The first image forming unit includes a photoreceptor drum 6Y, a charging unit 7Y arranged around the photoreceptor drum 6Y, an exposing unit 8Y, a developing unit 9Y, a photoreceptor cleaner 10Y, and the like. The second image forming unit includes a photoreceptor drum 6M, a charging unit 7M arranged around the photoreceptor drum 6M, an exposing unit 8M, a developing unit 9M, a photoreceptor cleaner 10M, and the like. The third image forming unit includes a photoreceptor drum 6C, a charging unit 7C arranged around the photoreceptor drum 6C, an exposing unit 8C, a developing unit 9C, a photoreceptor cleaner 100, and the like. The forth image forming unit includes a photoreceptor drum 6K, a charging unit 7K arranged around the photoreceptor drum 6K, an exposing unit 8K, a developing unit 9K, a photoreceptor cleaner 10K, and the like. One side of the carriage belt 2 is installed with a driving roller that actively rotates, and the other side thereof is installed with carriage rollers 3 and 4 as a driven roller subordinately rotating in an arrow direction in the drawing by virtue of rotation of the carriage rollers 3 and 4.

The lower portion of the carriage belt 2 is provided with a sheet feeder tray 5 where the paper sheets 1 are stored. The uppermost one of the paper sheets 1 stored in the sheet feeder tray 5 is fed during image formation, and is attached on the carriage belt 2 by virtue of electrostatic absorption in synchronization with the timing of optical unit operation for recording images using an intermediate register sensor 14.

The attached paper sheet 1 is sent to the first image forming unit for forming a yellow image, where a yellow image is formed. The surface of the photoreceptor drum 6Y is uniformly charged by the charging unit 7Y, and then, exposed by the exposing unit 8 to a laser light 11Y corresponding to the yellow image to form an electrostatic latent image.

In addition, the electrostatic latent image is formed by writing light beams based on main-scan/sub-scan techniques, and two-dimensional image light beams are recorded on a drum photosensitive surface by using the beam scanning from the exposing unit 8 as main scanning and using rotation of the photoreceptor drum perpendicular to the main scanning as the sub-scanning.

The electrostatic latent image formed on the surface of the photoreceptor drum 6Y is developed by the developing unit 9Y, and a toner image is formed on the photoreceptor drum 6Y. The toner image is transferred by the transfer unit 12Y at a position (transfer position) where the photoreceptor drum 6Y and the paper sheet 1 on the carriage belt 2 make contact with each other, and a single yellow color image is formed on the paper sheet 1. In the photoreceptor drum 6Y subject to the transferring, unnecessary toner remaining on the drum surface is cleaned by the photoreceptor cleaner 10Y to prepare a next chance of image formation.

As such, the paper sheet 1 onto which a single yellow color is transferred in the first image forming unit is carried by the carriage belt 2 to the second image forming unit to form an image of a magenta color. Even in this case, similar to the first image forming unit, a magenta toner image is formed on the photoreceptor drum 6M, and is overlappingly transferred to the yellow image already formed on the paper sheet 1. The paper sheet 1 is carried to the third image forming unit for further forming a cyan image and subsequently to the fourth image forming unit for forming a black image. The cyan and black images formed as in the cases of the yellow and the magenta are overlappingly transferred onto the immediately previous image. As the transferring of each color YMCK is completed, a color image is formed.

The paper sheet 1 having a color image passing through the fourth image forming unit is separated from the carriage belt 2, fixed by a fixing unit 13, and then discharged.

Figure 2:
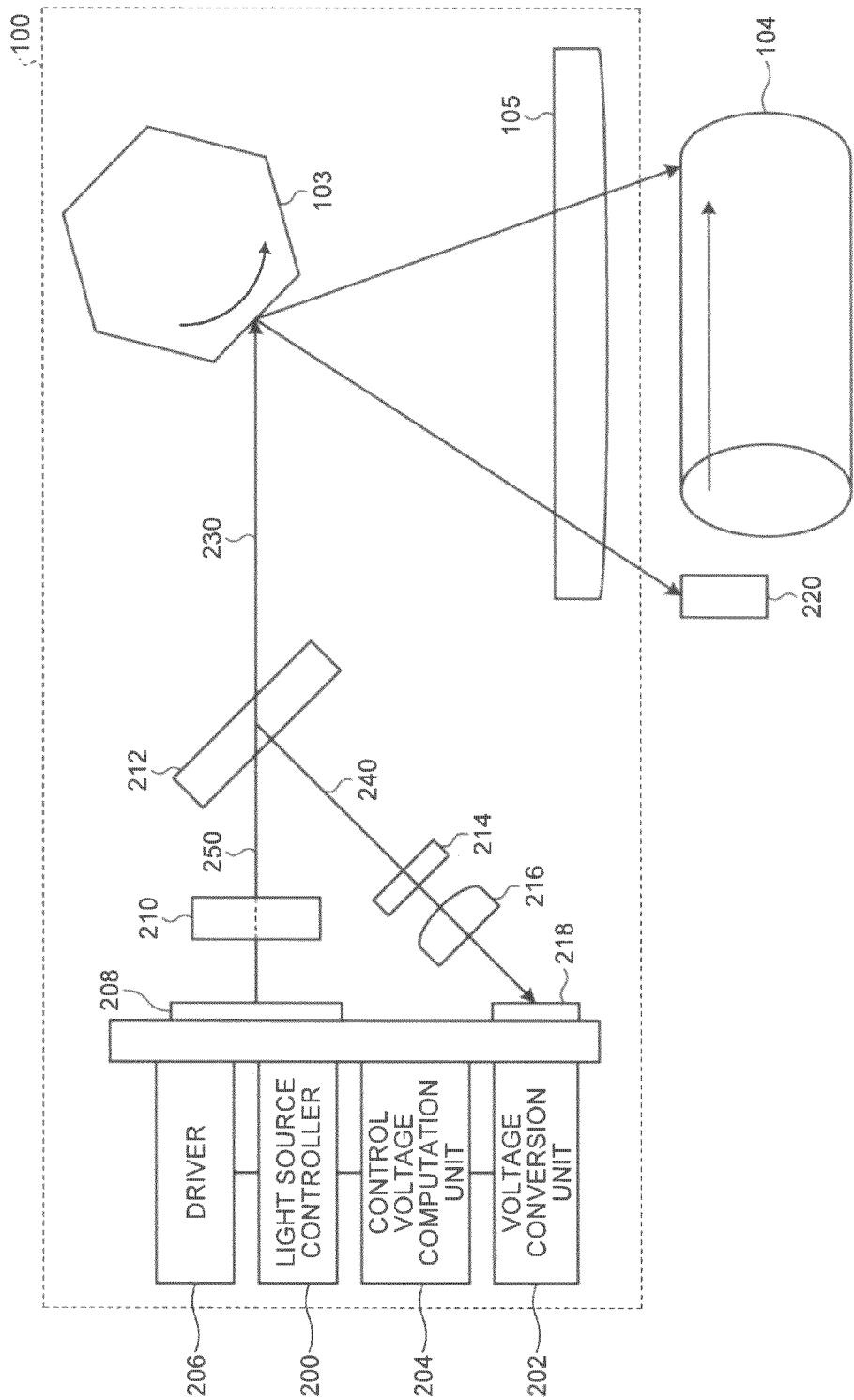
FIG. 2 is a schematic diagram illustrating an exemplary configuration of the optical device according to an embodiment.

FIG. 2 schematically illustrates an exemplary configuration of the optical device 100 included in the exposing unit 8 of the image forming apparatus 20 illustrated in FIG. 1. The optical device 100 includes: a light source unit that emits laser beams; an optical receiver unit that receives the laser beams to measure a light amount of the laser beams emitted from the light source unit; and an optical system for guiding the laser beams emitted from the light source unit onto a photoreceptor drum 104. In addition, the photoreceptor drum 104 represents the photoreceptor drums 6K, 6C, 6M, and 6Y of FIG. 1.

In the optical device 100, the light source unit has a laser beam source 208 capable of emitting a single or a plurality of laser beams. In addition, the light source unit has a light source controller 200, a control voltage computation unit 204, and a driver 206 used to control operation of the laser beam source 208. The light source controller 200 is configured using, for example, an application specific integrated circuit (ASIC).

The laser beam source 208 may be configured using a vertical cavity surface emitting laser (VCSEL) and is capable of outputting several tens of laser beams corresponding to several tens of channels (for example, 40 channels). The number of laser beams emitted from the laser beam source 208 is not limited to 40. In addition, the laser beam source 208 is not limited to the VCSEL, and a laser diode array and the like may be employed.

The optical system includes an optical coupler element 210, an optical splitting element 212, an optical shaping element 214, a condensing lens 216, a polygonal mirror 103, and an fθ lens 105. A laser beam 250 emitted from the laser beam source 208 is collimated by the optical coupler element 210, and then split into monitor beams 240 and scan beams 230 by the optical splitting element 212.

Figure 3:
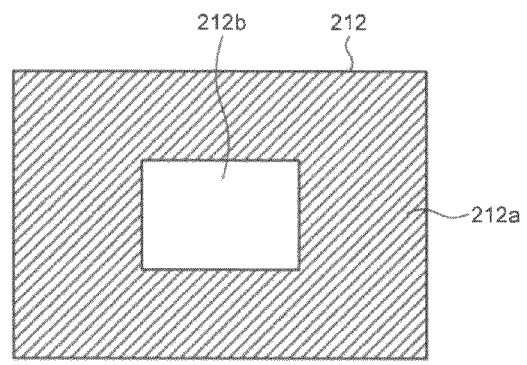
FIG. 3 is a schematic diagram illustrating an exemplary configuration of an aperture mirror.

According to the present embodiment, an aperture mirror having a reflective surface for reflecting the laser beams and an opening for transmitting the laser beams are used as the optical splitting element 212. FIG. 3 illustrates an exemplary configuration of the aperture mirror as the optical splitting element 212. In this example, the aperture mirror includes a reflective surface 212a and a rectangular-shaped opening 212b provided in the approximate center of the reflective surface 212a. The monitor beam 240 is formed by reflecting the laser beam 250 at the reflective surface 212a. The scan beam 230 is formed by shaping the wave surface when the laser beam 250 passes through the opening 212b.

The scan beam 230 emitted from the optical splitting element 212 is deflected by the polygonal mirror 103 that rotates at a predetermined speed, passes through the fθ lens 105, and is irradiated onto the photoreceptor drum 104. The scan beam 230 scans the photoreceptor drum 104 in a main scan direction in response to rotation of the polygonal mirror 103. A synchronization detection unit 220 is arranged in the scan initiation position of the photoreceptor drum 104. The synchronization detection unit 220 includes, for example, a photodiode as the optical receiver element and outputs a synchronization signal that provides timing for various control operations including light amount correction. The output from the synchronization detection unit 220 is supplied to CPU (not shown).

The monitor beam 240 emitted from the optical splitting element 212 passes through the optical shaping element 214 including the aperture mirror, where a wave surface thereof is shaped, and condensed by the condensing lens 216. Then, the monitor beam 240 is incident to the optical receiver unit having an optical receiver element 218 and a voltage conversion unit 202, and is received by the optical receiver element 218. The optical receiver element 218 includes, for example, a photodiode, which photoelectrically converts the light received by the light-receiving surface into an electric current corresponding to the amount of received light and outputs it. The voltage conversion unit 202 converts the electric current output from the optical receiver element 218 into a voltage using a resistor and the like, and supplies it to the control voltage computation unit 204 as a monitor voltage Vpd.

The control voltage computation unit 204 generates a drive current value for driving the laser beam source 208 and supplies it to the light source controller 200. In addition, the control voltage computation unit 204 updates the drive current value based on the monitor voltage Vpd supplied from the voltage conversion unit 202 of the optical receiver unit, and the updated drive current value is output to the light source controller 200.

The light source controller 200 receives a control signal from main CPU (not shown) that controls image formation in the image forming apparatus 20, and performs driving control of the laser beam source 208 based on the received control signal. In this case, the light source controller 200 generates a drive signal for instructing the drive current value supplied from the control voltage computation unit 204 to the driver 206. The drive signal is independently generated from each channel of the laser beam source 208.

In addition, in a case where image data are supplied from an image processing unit (not shown) to the light source controller 200, the light source controller 200 generates a drive signal for driving the laser beam source 208 based on the image data and the control signal received by the main CPU.

Furthermore, the light source controller 200 executes a line automatic power control (APC) for the laser beam source 208 in response to the instruction from the main CPU. The line APC refers to control for correcting the light amount of the laser beams at the timing whenever the laser beam is scanned in a main scan direction.

The driver 206 individually generates a drive current for driving the laser beam source 208 for each channel based on each drive signal of each channel of the laser beam source 208 supplied from the light source controller 200. The laser beam source 208 is lighted on depending on the drive current of each channel supplied from the driver 206 and emits laser beams of each channel.

Figure 4:
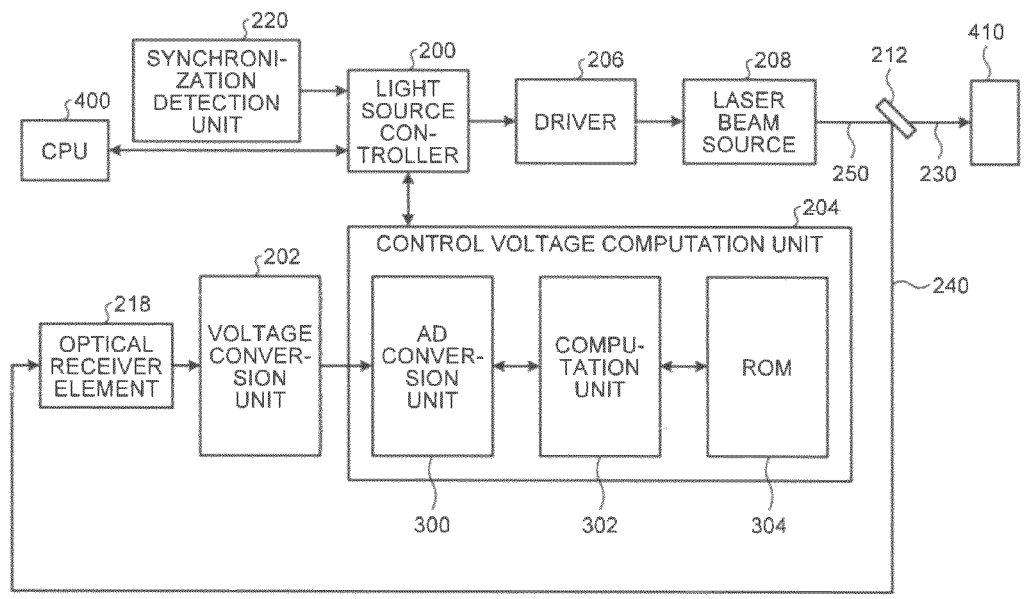
FIG. 4 is a block diagram illustrating exemplary configurations of a light source unit and an optical receiver unit in the optical device applicable to an embodiment.

FIG. 4 illustrates an exemplary configuration of the light source unit and the optical receiver unit in the optical device 100 applicable to the present invention in more detail. In FIG. 4, like reference numerals denote like element as in FIG. 2, and detailed description thereof will not be repeated.

A central processing unit (CPU) 400 is a main CPU for controlling image formation in the image forming apparatus 20 including the optical device 100. The light source controller 200 receives a control signal from the CPU 400 and performs initial setting of the laser beam source 208 or initiates automatic power control (APC) processing for the laser beam source 208. In addition, the light source controller 200 controls drive operation of the driver 206 based on a control voltage supplied from the control voltage computation unit 204 such that the laser beam source 208 emits a light amount of the laser beams 250 corresponding to the control voltage.

The control voltage computation unit 204 includes an A/D conversion unit 300, a computation unit 302, and a read only memory (ROM) 304. The control voltage computation unit 204 converts the monitor voltage Vpd supplied from the voltage conversion unit 202 as an analog signal into a digital value using the A/D conversion unit 300 and supplies it to the computation unit 302. The computation unit 302 computes a control voltage for emitting a predetermined light amount of laser beams 250 to the laser beam source 208 based on the supplied monitor voltage Vpd and the values in the table stored in the ROM 304 described below. The computed control voltage is supplied to the light source controller 200.

As such, the APC operation is realized by receiving the emitted laser beams 250, monitoring the emission light amount P of the laser beams 250, and controlling the emission light amount P of the laser beams 250 depending on the monitoring result.

The ROM 304 stores in advance various control values and the like in the event of factory shipment. Such various control values in the event of factory shipment include a table containing light amounts (emitted power) of the laser beams and measurement values (monitor voltages) for the light amounts of the monitor beams corresponding to the light amounts of the laser beams. The computation unit 302 generates the APC signal used when the APC processing is performed by the light source controller 200 using the monitor voltage Vpd supplied from the voltage conversion unit 202 and the table stored in the ROM 304.

An optical sensor 410 is provided to measure the light amount of the scan beam 230 when the table is created in the event of factory calibration described below. The output from the optical sensor 410 is output to a computer (not shown) used in factory calibration. The optical sensor 410 may be available in the event of factory shipment calibration, and is not necessarily always installed in the optical device 100.

FIG. 5 is an exemplary configuration of the table stored in the ROM 304. In the example of FIG. 5, the light amount of the laser beam is indicated by an emission power, two points having low and high emission powers $P_1$ and $P_2$ are provided as measurement points, and the monitor voltages $Vpd_1$ and $Vpd_2$ measured at the two measurement points are associated with the emission powers $P_1$ and $P_2$, respectively. Each light amount is stored for each light-emitting point (channel ch) of the laser beam source 208.

That is, in FIG. 5, for the channel ch1, the low emission power $P_{1-1}$ is associated with the monitor voltage $Vpd_{1-1}$ obtained by measuring the emission power $P_{1-1}$, and the high emission power $P_{2-1}$ is associated with the monitor voltage $Vpd_{2-1}$ obtained by measuring the emission power $P_{2-1}$. Similarly, for the channel ch2, the low emission power $P_{1-2}$ is associated with the monitor voltage $Vpd_{1-2}$ obtained by measuring the emission power $P_{1-2}$, and the high emission power $P_{2-2}$ is associated with the monitor voltage $Vpd_{2-2}$ obtained by measuring the emission power $P_{2-2}$. As such, for each channel ch, two emission powers $P_1$ and $P_2$ are associated with the monitor voltages $Vdp_1$ and $Vdp_2$ obtained by measuring the emission powers $P_1$ and $P_2$, respectively, and they are stored in the ROM 304.

Although two measurement points are used in this example, the invention is not limited thereto. Alternatively, three or more measurement points may be used. Similarly, in this case, the monitor voltage Vpd at each measurement point is associated with the emission power P of the measurement point, and they are stored in the ROM 304.

In addition, in a case where the measurement points are two emission powers $P_1$ and $P_2$, the emission powers $P_1$ and $P_2$ are preferably set to lower and upper limits, respectively, of a light amount control range of the laser beam source 208. The lower and upper limits of the light amount control range are instructed from, for example, the CPU 400. In addition, if three measurement points are used, it may be envisaged that the emission powers $P_1$ and $P_2$ are set to upper and lower limits, respectively, of the light amount control range of the laser beam source 208, and the emission power $P_3$ of the third measurement point is set to a middle value between the emission powers $P_1$ and $P_2$.

A method of creating such a table will be described shortly. For example, in the event of factory shipment, each channel of the laser beam source 208 obtains a value of the monitor voltage Vpd generated by the optical receiver element 218 when the scan beam 230 of FIG. 2 is irradiated with a reference emission light amount P, from the control voltage computation unit 204 and the like. In the control voltage computation unit 204, the value of the obtained monitor voltage Vpd is associated with the reference emission light amount P and the channel number, and they are stored in the ROM 304.

The driver 206 is controlled by a factory calibration computer (not shown) through the light source controller 200 to turn on an operation-enable signal of the channel (for example, channel ch1) for which calibration is initially performed, and the drive current gradually increases. If it is detected that the light amount of the scan beam 230 based on the laser beam 250 of the channel ch1 reaches a reference light amount range, the optical sensor 410 notifies the factory calibration computer of this fact.

As this notification is received, the factory calibration computer notifies the control voltage computation unit 204 through the light source controller 200 of a fact that the light amount of the scan beam 230 of the channel ch1 reaches the reference light amount. In addition, the reference light amount is set to be equal to or larger than 0. As this notification is received, the control voltage computation unit 204 writes the monitor voltage Vpd caused by the optical receiver element 218 to the ROM 304 at that moment. At the same time, the factory calibration computer also transmits the emission power of the laser beam source 208 or the light amount value of the scan beam 230 measured by the optical sensor 410 to the control voltage computation unit 204. The control voltage computation unit 204 also stores the transmitted light amount of the scan beam 230 or the emission power of the laser beam source 208 in the ROM 304. The process described above is repeated for 40 channels.

The light amount of the monitor beam 240 reflected at the optical splitting element 212 (aperture mirror) is sufficiently small relative to the light amount of the laser beam 250 emitted from the laser beam source 208. Therefore, the light amount of the scan beam 230 may be considered as the light amount of the laser beam 250.

The APC operation for the laser beam 250 using such a table will be described. The computation unit 302 obtains a relational expression representing a relation between the emission light amount of the laser beam 250 and the monitor voltage Vpd based on the data of the table in the event of the APC operation in the light source controller 200. Here, a relation between the emission power P and the monitor voltage Vpd is used assuming that the emission light amount of the laser beam 250 is proportional to the emission power P of the laser beam source 208.

Meanwhile, as the laser beams 250 are emitted by the light source controller 200 with a light amount set in, for example, the CPU 400 and the like, a part of the emitted laser beams 250 is slit by the optical splitting element 212 and forms the monitor beams 240. The monitor beams 240 are received by the optical receiver element 218 to obtain the monitor voltage Vpd. The computation unit 302 predicts the emission power P of the laser beams corresponding to the monitor voltage Vpd from a relational expression representing a relation between the emission power P of the laser beam 250 and the monitor voltage Vpd and outputs a control voltage corresponding to the predicted emission power P to the light source controller 200.

Figure 6:
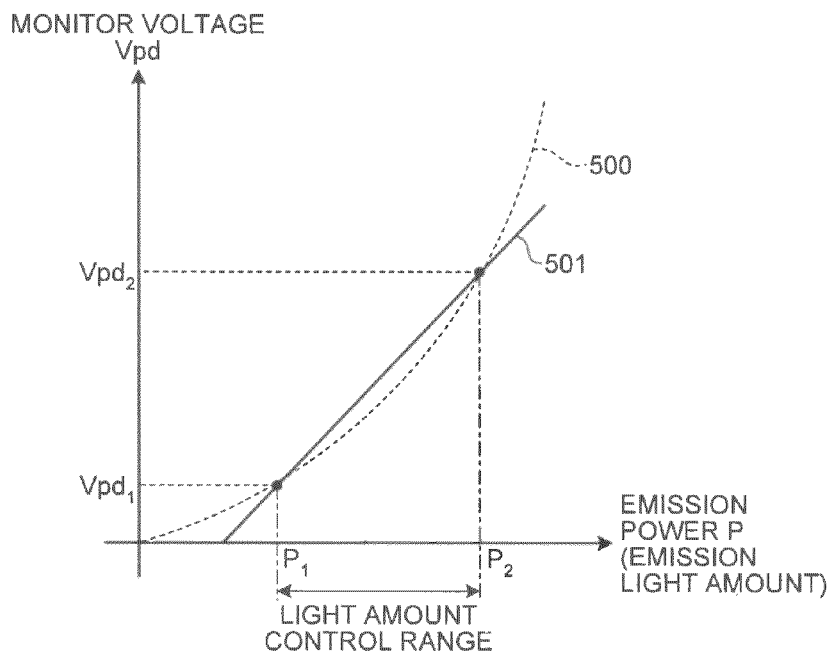
FIG. 6 is a diagram illustrating a method of obtaining a relational expression of a relation between an output power P of the laser beam and a monitor voltage Vpd.

For example, a relational expression representing a relation between the emission power P of the laser beam 250 and the monitor voltage Vpd can be obtained as follows. That is, referring to FIG. 6, the control voltage computation unit 204 creates a primary equation of the emission power P against the monitor voltage Vpd based on the emission powers $P_1$ and $P_2$ of the laser beams 250 and the monitor voltages $Vpd_1$ and $Vpd_2$ corresponding to the emission powers $P_1$ and $P_2$, respectively. The control voltage computation unit 204 obtains the emission power P corresponding to the monitor voltage Vpd based on this primary equation, and outputs a control voltage corresponding to the obtained emission power P. In FIG. 6, a straight line 501 represents the created primary equation, and a curve 500 represents an actual monitor voltage Vpd against the emission power P.

Figure 7:
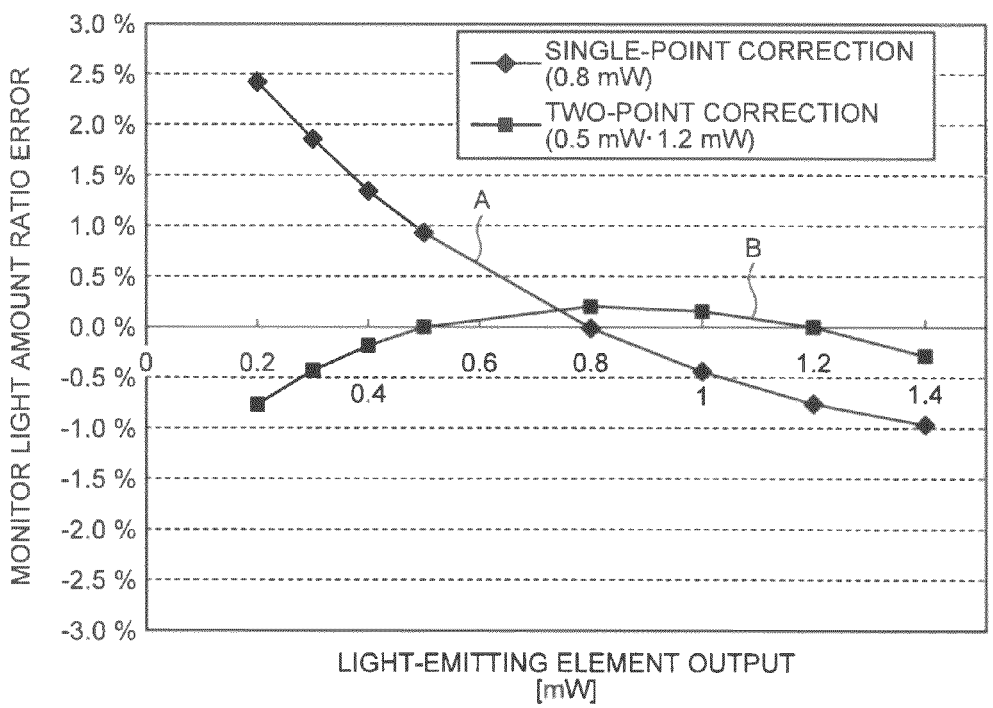
FIG. 7 is a schematic diagram illustrating an comparison example of an error of the predicted monitor light amount Vpd in a case where two measurement points are used and a case where a single measurement point are used.

FIG. 7 is an example of comparing errors of the predicted monitor light amount Vpd against the emission power P when two measurement points are used and when a single measurement point is used. The abscissa denotes the emission power P as a light-emitting element output, and the ordinate denotes an error in the prediction of the monitor light amount Vpd as a relative error of the monitor light amount. The curve A corresponds to an example in which prediction is made using a single measurement point according to a method of the related art, and the curve B corresponds to an example in which prediction is made using two measurement points according to a method of the present embodiment. As such, it is recognized that the prediction using two measurement points entirely has less errors and also has a smaller change of the errors for the emission power P in comparison with the prediction using a single measurement point. Therefore, it is possible to control the light amount for the emission beam with higher precision by using the method of the present embodiment.

Figure 8A:
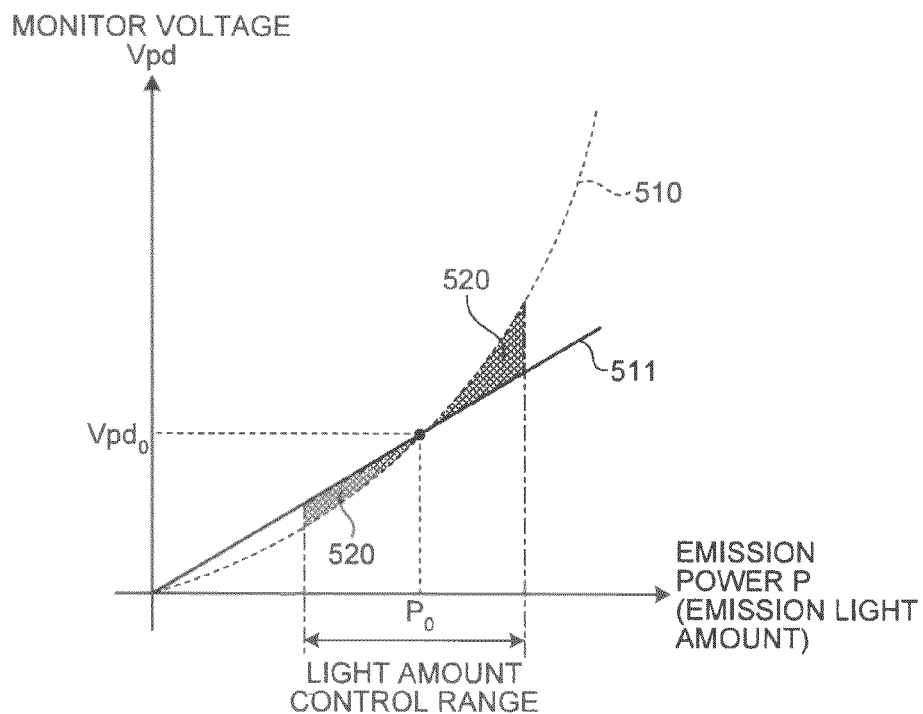
FIGS. 8A and 8B are schematic diagram illustrating a difference of the error amount caused by the number of measurement points.
Figure 8B:
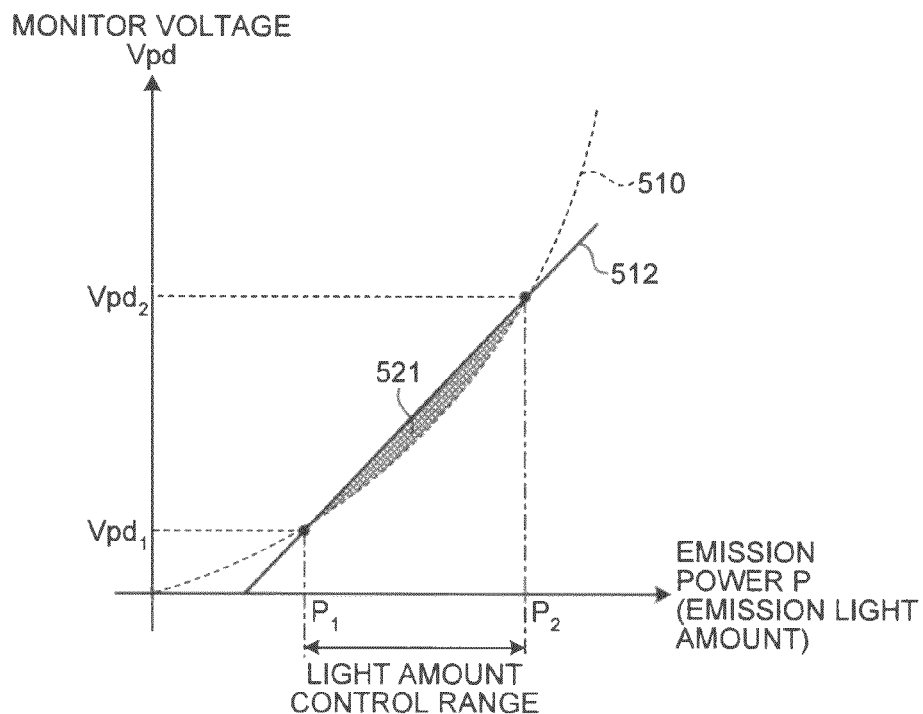
Figure 9:
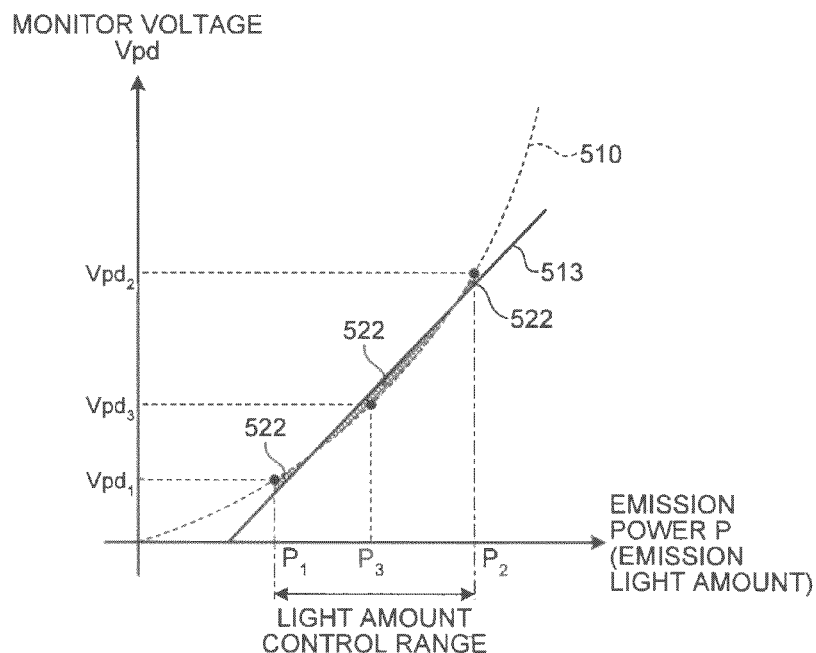
FIG. 9 is a schematic diagram illustrating a difference of the error amount caused by the number of measurement points.

Referring to FIGS. 8 and 9, a difference of the error amount according to the number of measurement points will be described shortly. In FIGS. 8A, 8B, and 9, the abscissa denotes the emission power P of the laser beam source 208, and the ordinate denotes a monitor voltage Vpd. A curve 510 represents an example of change of the actual monitor voltage Vpd against the emission power P.

FIG. 8A shows an example in which only a single point of the emission power $P_0$ located in the approximate center of the light amount control range of the laser beam source 208 is used as the measurement point. In this case, a straight line 511 passing through the origin is obtained from the emission power $P_0$ and the corresponding monitor voltage $Vpd_0$, and the monitor voltage Vpd is predicted along the straight line 511. The area of a region 520 interposed between the straight line 511 and the curve 500 in the light amount control range indicates the error of the predicted monitor voltage Vpd.

FIG. 8B illustrates an example in which two points of the emission powers $P_1$ and $P_2$ in both ends of the light amount control range for the laser beam source 208 is used as the measurement point. In this case, a straight line 512 of the primary equation is obtained from the monitor voltages $Vpd_1$ and $Vpd_2$ corresponding to the emission powers $P_1$ and $P_2$, respectively, and the monitor voltage Vpd is predicted along this straight line 512. In this case, the area of a region 521 interposed between the straight line 512 and the curve 510 in the light amount control range indicates an error of the predicted monitor voltage Vpd.

In the example in which only a single measurement point is used in FIG. 8A, since the approximate center of the light amount control range is used as the measurement point, the region 520 indicating the error is successively widened toward both ends of the light amount control range with respect to this measurement point. In comparison, in the method of using two measurement points of FIG. 8B, since the region 521 indicating the error is closed within the light amount control range, it is anticipated that the error is reduced compared to the method of using a single measurement point.

Alternatively, three or more measurement points of the emission power P may be used. FIG. 9 illustrates an example in which three measurement points are used, including emission powers $P_1$ and $P_2$ in both ends of the light amount control range for the laser beam source 208 and the emission power $P_3$ located in the approximate center. In this case, for example, it is envisaged that a straight line 513 for predicting the monitor voltage Vpd is obtained based on a least-square technique using the emission powers $P_1$ and $P_2$ at three measurement points and the monitor voltages $Vpd_1$, $Vpd_2$, and $Vpd_3$ for the three measurement points. In the method of using three measurement points, it is anticipated that the area of a region 522 indicating the error may be further reduced, compared to the method of using two measurement points shown in FIG. 8B.

The invention is not limited thereto, and may be embodied such that, in a case where three measurement points are used, curve approximation may be used, or a straight line passing through two neighboring measurement points may be combined. Alternatively, four or more measurement points may be used. In this case, it is anticipated that accuracy is further improved. In practice, since time for measurement to create the table stored in the ROM 304 or a data size of the table is constrained, it is preferable that the number of measurement points be limited to a minimum. That is, in a case where the laser beam source 208 includes a 40-channel VCSEL, the measurement is performed (the number of measurement points multiplied by 40 channels) times. Therefore, the measurement takes long time, and the data amount stored in the table also increases.

For this reason, the number of measurement points may be set to a minimum number by which the error of the monitor voltage Vpd is within a predetermined allowable range. For example, it is envisaged that the allowable range is determined based on quality of images formed on a sheet in practice when the APC control is performed for the laser beam source 208 using the predicted monitor voltage Vpd in consideration of errors.

Next, the operation of the APC applicable to the present embodiment will be described with reference to the timing chart of FIGS. 10 and 11. Hereinafter, description will be made for a case where each laser beam source 208 has light-emitting points capable of independently emitting laser beams 250 corresponding to 40 channels, and two measurement points of the emission power P are used.

Figure 10:
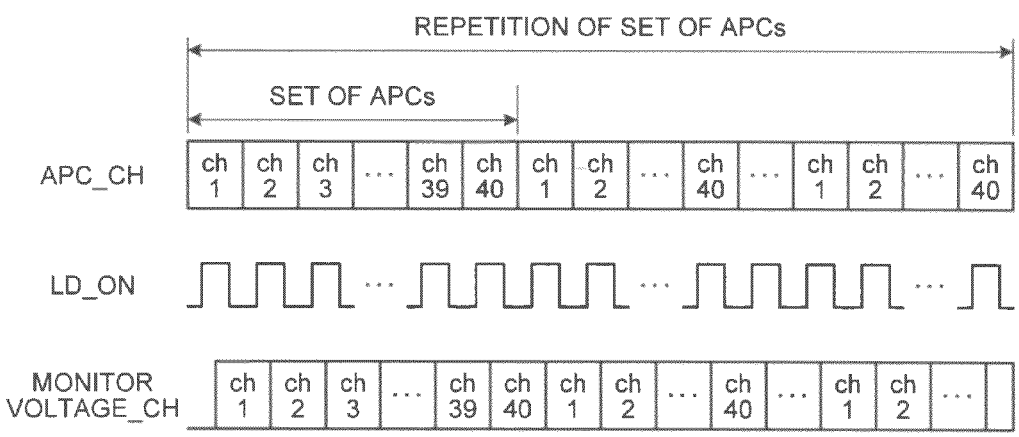
FIG. 10 is a timing chart illustrating an exemplary initialization operation of the APC.

FIG. 10 is an exemplary timing chart illustrating an initialization operation of the APC. In FIG. 10, APC_CH denotes a channel where the APC is performed, and LD_ON indicates that laser beam 250 is emitted from the laser beam source 208 using the channel "CH." In addition, the monitor voltage_CH shows a channel where the monitor voltage Vpd is obtained. As such, in the initialization operation, the APC is performed for each channel of the laser beam source 208, so that the APCs for overall channels, that is, 40 channels are established as a set of APCs, and the set of APCs are repeatedly performed.

Before the operation of the timing chart of FIG. 10, first, from the main CPU 400 for controlling image formation of the image forming apparatus 20, a target light amount value (target emission power) for performing the APC and the APC start signal are transmitted to the light source controller 200. The light source controller 200 transmits the received APC target emission power to the control voltage computation unit 204.

In the control voltage computation unit 204, the computation unit 302 references the table (refer to FIG. 5) stored in the ROM 304 for each channel, in which a plurality of emission powers P are associated with a plurality of monitor voltages Vpd corresponding to each emission power P. In this table, a pair of the emission power $P_{1\text{-}1}$ and the corresponding monitor voltage $Vpd_{1\text{-}1}$, and a pair of the emission power $P_{2\text{-}1}$ and the corresponding monitor voltage $Vpd_{2\text{-}1}$ generated by two measurement points are read, and a relational expression between the emission power P and the monitor voltage Vpd of the channel ch1 is obtained. The computation unit 302 computes a target monitor voltage serving as a target value of the feedback monitor voltage Vpd based on the relational expression obtained from the table and the APC target light amount value received from the light source controller 200.

The computation unit 302 computes the aforementioned target monitor voltage for 40 channels by referencing the table stored in the ROM 304. As the computation of the target monitor voltages for 40 channels is completed, the control voltage computation unit 204 notifies that the computation of the target monitor voltage is completed, and transmits an initial drive current to initiate the APC for the laser beam source 208 to the light source controller 200.

Next, the light source controller 200 turns on the channel ch1 using the initial drive current received from the control voltage computation unit 204, and notifies the control voltage computation unit 204 of a fact that the channel ch1 is being turned on. The control voltage computation unit 204 receives a signal notifying that the channel ch1 is being turned on, and obtains the output of the optical receiver element 218 at that time point as a voltage through a voltage conversion unit 202 so that the voltage is converted into a digital value using the A/D conversion unit 300.

The control voltage computation unit 204 compares the digital value of the monitor voltage Vpd and the target monitor voltage of the channel ch1 obtained as described above to determine a drive current value near the target monitor voltage and transmits the determined drive current value to the light source controller 200 as an electric current for turning on the next channel ch1. Then, as shown in FIG. 10, the same process is repeated up to the channel ch40, and the same process is repeated from the channel ch1 again.

For repetition frequency performed for a set of channels ch1 to ch40, frequency at which the monitor voltage values Vpd of each channel are stabilized and approaches the target monitor voltage values of each channel is set using the light source controller 200 in advance. The initialization is carried out to determine the drive current value of the laser beam source 208 when the image forming apparatus 20 starts to print.

Figure 11:
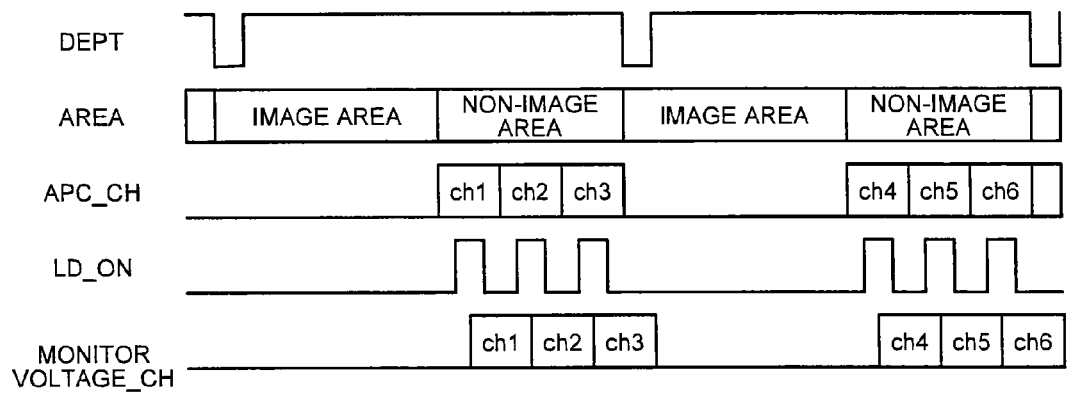
FIG. 11 is a timing chart illustrating an exemplary APC synchronized with the synchronization signal.
Figure 12:
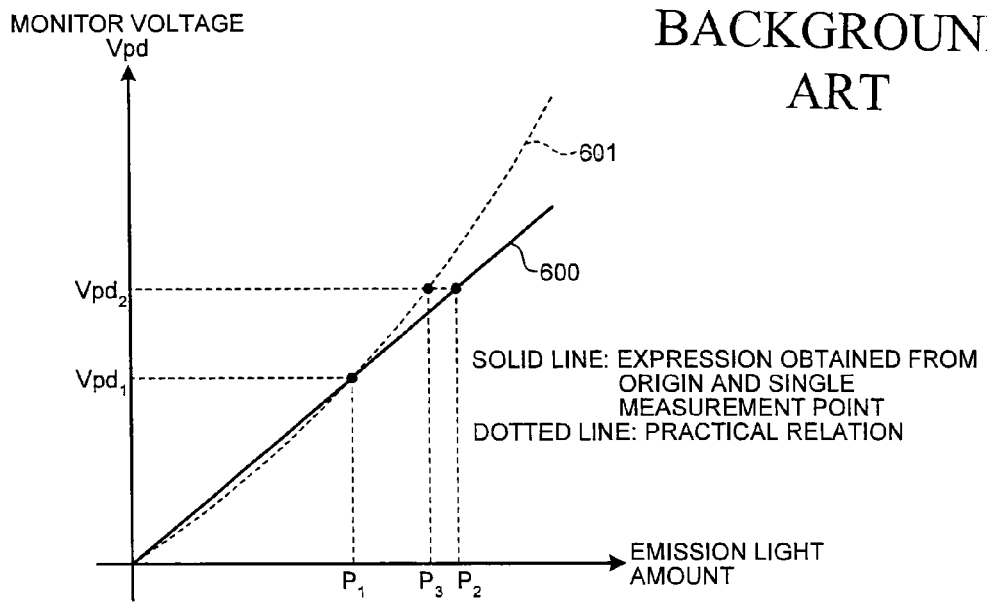
FIG. 12 is a schematic diagram illustrating light amount control according to the related art.
Figure 13:
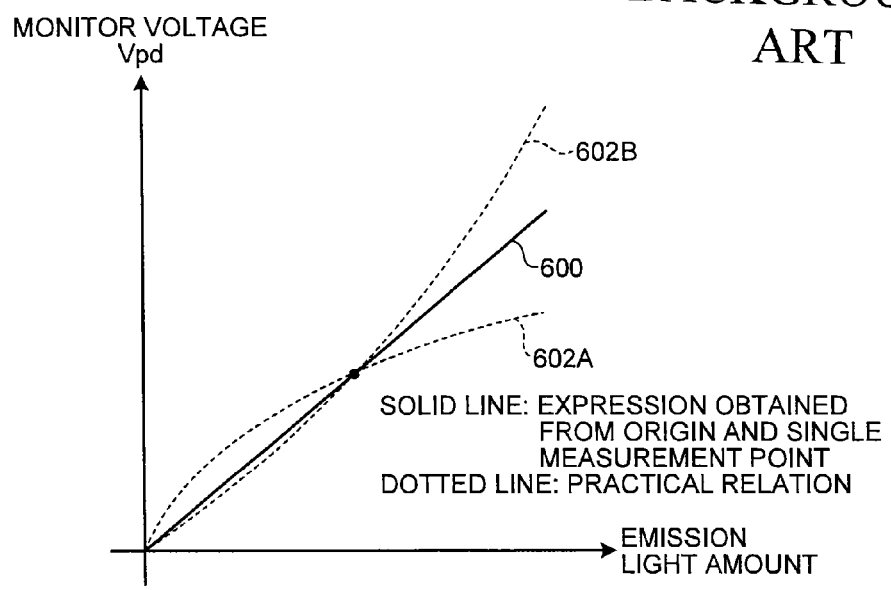
FIG. 13 is a schematic diagram illustrating light amount control according to the related art.

FIG. 11 illustrates an exemplary timing chart illustrating the APC synchronized with the synchronization signal preceded by the aforementioned initialization. In FIG. 11, the synchronization signal DEPT is a signal generated by the synchronization detection unit 220 (refer to FIG. 2) as the scan beam 230 passes through the corresponding synchronization detection unit 220 and transmitted to the light source controller 200. The synchronization signal DEPT serves as a reference signal for determining a write start position of the photoreceptor drum 104 and is generated in each scanning of the scan beam 230. As illustrated in FIG. 11 as the areas, a time period between the synchronization signal DEPT and the next synchronization signal DEPT can be divided into an image area for which exposure is performed for the photoreceptor drum 104 using the scan beam 230 and a non-image area subsequent to the image area, for which the scan beam 230 is deviated by the photoreceptor drum 104. The APC synchronized with the synchronization signal DEPT is carried out for the non-image area.

As the aforementioned initialization process is terminated, then, the APC is performed in synchronization with the synchronization signal DEPT. The APC operation synchronized with the synchronization signal DEPT is similar to the APC operation in the aforementioned initialization process. That is, the laser beam source 208 is sequentially turned on starting from the channel ch1, and feeds back the monitor voltage Vdp to the control voltage computation unit 204 as the laser beam source 208 is turned on to determined the next drive current.

Here, since the time period of the non-image area is limited, in a case where the initialization process is terminated, and the process advances to a typical print operation, the number of channels of the APC that can be performed for a single non-image area is also limited. In the example of FIG. 11, in the period of a single non-image area, the APC is performed for three channels. The APC synchronized with the synchronization signal DEPT is to prevent change of the light amount of the laser beams 250 emitted from the laser beam source 208 even when ambient temperature or the like of the laser beam source 208 changes during print operation of the image forming apparatus 20. As such, such an object can be achieved by sequentially performing the APC for each of a plurality of channels for each non-image area in the scanning of the scan beam 230 for the photoreceptor drum 104.

According to the embodiment, it is possible to improve the light amount control accuracy in controlling the light amount of the emission beams.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical device comprising:
   an irradiation unit that irradiates a part of laser beams output from a light source as a scan beam onto an irradiation target and outputs a remaining part of the laser beams as a monitor beam used to monitor a light amount of the laser beams;
   a measurement unit that measures a light amount of the monitor beam;
   a storage unit that stores a plurality of measurement results obtained by the measurement unit when each of the laser beams is output in a plurality of different light amounts, by associating the plurality of measurement results with the plurality of the different light amounts, respectively;
   a prediction unit that predicts a light amount of the monitor beam relative to a reference light amount of a laser beam using a plurality of the light amounts stored in the storage unit and the measurement results corresponding to the plurality of the light amounts; and
   a control unit that controls the irradiation unit such that the light amount of the monitor beam relative to the reference light amount of the laser beam is equal to the light amount of the monitor beam predicted by the prediction unit,
   wherein the prediction unit predicts the light amount of the monitor beam relative to a reference light amount of the laser beam using only the plurality of the light amounts corresponding to the laser beam and the measurement results corresponding to the plurality of the light amounts.

2. The optical device according to claim 1,
   wherein the prediction unit performs the prediction using a minimum number of the measurement results and the light amounts corresponding to the measurement results, so that a difference between the light amount of the monitor beam measured by the measurement unit when a laser beam of a reference light amount is output from the light source, and the light amount of the monitor beam predicted for the reference light amount is within a predetermined allowable range.

3. The optical device according to claim 1,
   wherein the prediction unit performs the prediction based on a relational expression obtained from two measurement results stored in the storage unit and two light amounts corresponding to the two measurement results.

4. The optical device according to claim 1,
   wherein the prediction unit performs the prediction based on a relational expression obtained from three measurement results stored in the storage unit and three light amounts corresponding to the three measurement results.

5. The optical device according to claim 1,
   wherein the irradiation unit includes an optical splitting unit that splits the laser beams into the monitor beam and the scan beam.

6. The optical device according to claim 5,
   wherein the optical splitting unit is provided with a reflection unit that reflects the laser beams output from the light source to obtain the monitor beam and an opening that transmits the laser beams to obtain the scan beam.

7. The optical device according to claim 1,
   wherein a range of the plurality of light amounts stored in the storage unit includes a minimum light amount and a maximum light amount of a light amount control range predetermined for the light amount of the laser beam.

8. A control method of an optical device, the method comprising:
   extracting, by an irradiation unit, a scan beam and a monitor beam used to monitor a light amount of the scan beam from laser beams output from a light source;
   irradiating, by the irradiation unit, the scan beam onto an irradiation target;
   measuring, by a measurement unit, a light amount of the monitor beam;
   predicting, by a prediction unit, a light amount of the monitor beam relative to a reference light amount of the laser beam based on two or more light amounts stored in a storage unit that stores a plurality of measurement results obtained from a plurality of measurement units when each of the laser beams is output in a plurality of different light amounts, in association with the plurality of light amounts, each measurement result being associated with each of the two or more light amounts; and controlling, by a control unit, the irradiating of the scan beam such that the light amount of the monitor beam relative to the reference light amount of the laser beams is equal to a light amount of the predicted monitor beam, wherein the predicting includes predicting the light amount of the monitor beam relative to a reference light amount of the laser beam based only on the plurality of the light amounts corresponding to the laser beam and the measurement results corresponding to the plurality of the light amounts.

9. An image forming apparatus comprising:

an optical device; and an image forming unit that forms an image using a scan beam output from the optical device, the optical device comprises:

an irradiation unit that outputs a part of laser beams output from a light source as the scan beam to the image forming unit and outputs a remaining part of the laser beams as a monitor beam used to monitor a light amount of the laser beams;

a measurement unit that measures a light amount of the monitor beam;

a storage unit that stores a plurality of measurement results obtained by the measurement unit when each of the laser beams is output in a plurality of different light amounts, by associating the plurality of the measurement results with the plurality of the different light amounts, respectively;

a prediction unit that predicts a light amount of the monitor beam relative to a reference light amount of the laser beam using a plurality of the light amounts stored in the storage unit and the measurement results corresponding to the plurality of the light amounts; and a control unit that controls the irradiation unit such that the light amount of the monitor beam relative to the reference light amount of the laser beam is equal to the light amount of the monitor beam predicted by the prediction unit, wherein the prediction unit predicts the light amount of the monitor beam relative to a reference light amount of the laser beam using only the plurality of the light amounts corresponding to the laser beam and the measurement results corresponding to the plurality of the light amounts.

* * * * *